April 6, 1965 R. F. SEEDORF Re. 25,751
PRINTED MATERIALS FOR COVERING FLOORS, WALLS AND THE LIKE
Original Filed July 31, 1957
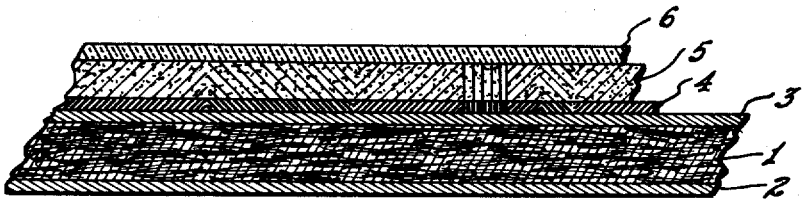
INVENTOR.
RALPH F. SEEDORF,
BY Allen & Allen
ATTORNEYS.

United States Patent Office

Re. 25,751
Reissued Apr. 6, 1965

25,751

PRINTED MATERIALS FOR COVERING FLOORS, WALLS AND THE LIKE

Ralph F. Seedorf, Cincinnati, Ohio, assignor to Carthage Mills Incorporated, Cincinnati, Ohio, a corporation of Ohio Original No. 3,109,746, dated Nov. 5, 1963, Ser. No. 675,401, July 31, 1957. Application for reissue Feb. 10, 1964, Ser. No. 362,541
3 Claims. (Cl. 117—15)

Matter enclosed in heavy brackets [ ] appears in the original patent but forms no part of this reissue specification; matter printed in italics indicates the additions made by reissue.

In the production of coverings of a printed nature for floors, walls and sink or countertops, the useful life of the covering depends among other things upon the thickness of that layer which bears the design or decorative pattern. Felt base floor coverings may be taken as an example. In the manufacture of these products as asphalt saturated felt of suitable thickness is provided on one side with a back covering and on the other side with a suitable sealing layer. A design or pattern coating in paint-like materials may then be imposed upon the sealing coat. If this is done by flat-bed printing means, the decorative layer may be given a conventional thickness which will provide a substantial wear-life.

There has been a substantial development in the production of covering materials which are printed on rotary machinery by lithographic, rotogravure, off-set or rotary rubber or linoleum block types of printing cylinders or by etched, knurled or photo-engraved printing rolls. In such operations the designs must be formed from ink or ink-like materials applied in a relatively thin layer. Such a thin layer is quickly worn through by abrasion such as foot traffic or scrubbing. As a consequence it has been the practice to protect the design by the application of a clear coating of plastic or varnish over the design or pattern layer. Such a clear coating must be worn through before the design layer is itself subjected to wear.

The primary object of this invention is to provide a means and method for very substantially increasing the wear-life of such products, particularly those in which the design coating is applied by means of rotary equipment, although the invention is not confined thereto.

This and other objects of the invention which will be set forth hereinafter or will be apparent to one skilled in the art upon reading these specifications is accomplished by that procedure and in the formation of that product of which certain exemplary embodiments will hereinafter be described. Reference is made to an accompanying drawing which diagrammatically illustrates in cross section the construction of the product of this invention.

The invention is based on the discovery that it is possible to print a suitable foundation material with a design in ink-like substance containing dyes, and then apply over the design coating a layer of opaque wear-resistant substance which will be stained upwardly throughout its thickness by the dyes in the design coating, thus providing a wear-resistant layer which carries the design throughout its thickness. The ink-like materials, although they can be applied in any way desired, are conveniently and inexpensively applied by rotary printing means. The coating which is to be stained by the dyes can be inexpensively applied by knifing, roller-coating or in other ways. If desired, a clear top coating may also be employed.

The nature of the foundation material is not a limitation on this invention. It may be the ordinary dry felt, saturated with asphalt, which is used in the familiar felt-base floor and wall coverings of commerce. Other foundation materials likewise may be used, such for example as layers of paper laminated together with bituminous, resinous or rubbery adhesives. The paper may be creped or not as desired. Combinations of paper and textile materials may likewise be employed as can various fibrous sheets of felted character not classed as ordinary papers. The choice of a foundation material may be governed by the qualities desired in the final product such for example as flexibility, feel, the ability to take sharp bends without cracking and the like, as well as by considerations of economy. The invention will be described herein in connection with the use of conventional asphalt-saturated felt paper, a layer of this material being indicated in the accompanying drawing by the index numeral 1. Such a felt base will be given a back coating of the usual type, which need not be described here since it is conventional in the art. A back coating is indicated at 2 in the drawing. It may here be noted, however, that depending upon the use for which the product is intended, as for example where the product is to be cemented to a wall or counter-top, special back coatings may be employed which coact with the adhesive intended to be used. As a single example, back coatings such as those described in Patent No. 2,460,787, issued February 1, 1949, in the name of the present inventor may be used.

The face side of the saturated felt will be given a coating for the combined purpose of sealing the saturant and smoothing the sheet. Sealing coatings for this purpose are today usually of the type employing an aqueous medium such as oleo or oleo-resinous emulsions or synthetic polymer latices. Exemplary sealing coatings of the first type may be made up as follows:

| | Percent |
|---|---|
| Water | 27.2 |
| Sodium resinate | 2.3 |
| Ammonium caseinate solution | 2.3 |
| Slate flour | 36.2 |
| China clay | 18.1 |
| Bodied drying oil containing the usual driers | 13.9 |
| | 100.0 |

The bodied drying oils are usually of the linseed oil or processed soya types.

A latex binder sealing coat may be made up as follows:

18.5% titanium dioxide
6.9% calcium carbonate
6.9% mica
16.2% of a 2½% solution of methyl cellulose
20.8% water
0.2% germicide
0.9% defoamer
29.6% styrene butadiene latex Such coating materials or other suitable ones of which there are a wide variety may be applied to the face side of the base material, by knifing, roller coating and the like. It may be pointed out that in some instances no sealing coat may be necessary. For example, in the use of a base material which is made up of paper layers plied together, and in which the top paper layer is devoid of staining saturant and is smooth enough for printing, a sealing coat may be omitted. A sealing coat is indicated in the drawing hereof at 3.

Next a design is printed on the basis material or on its sealing coat in ink-like materials preferably by means of lithographic, rotogravure, offset or rotary rubber or linoleum block printing means, the ink-like materials containing dye substances as hereinafter set forth. Over the design there is placed a coating of a pigmented paint or emulsion of such character that before it has dried and set, it will act to release the dyes in the ink layer. These dyes stain the last mentioned coating upwardly throughout its thickness converting it into a design layer. The principles of the invention may be achieved through the use (a) of an ink containing a water soluble dye or staining material suspended in an aqueous medium with a water soluble binder and through the use of an over-coating of a water type paint or emulsion, (b) through the use of inks containing oil soluble dyes or stains in an oily medium and an over-coating of oil paint, or (c) through the use of alcohol soluble dyes or stains in the inks and an over-coating of alcohol soluble paint-like substance. In the drawing a design formed in iniks is indicated at 4 and an over-coating at 5. Examples will be given of each of the modes of carrying the invention into effect.

EXAMPLE I

An ink-like substance may be made up as follows:

50 parts by weight of water
3 parts by weight of casein
0.5 part by weight of ammonium hydroxide
1 part of Crocein scarlet dye If desired a small quantity of isopropyl alcohol or defoamer or both may be added. Other water soluble dyes may be substituted for the Crocein scarlet. Further, the amount of dye in the ink-like substance may be varied as determined by the required final color. Mixtures of any of the water soluble dyes may be used in any formula. The ink or inks may be made up to a consistency suitable for rotary printing. Uusualy, a design is desired employing multiple color areas of different hues; and the usual rotary printing operation at this stage will be a multiple printing of say three or four colors. To obtain particularly deep tones a plurality of color impressions may be caused to overlap in some areas of the design.

In the exemplary embodiment a felt base material bearing a sealing coat as above set forth was printed with multiple impressions of inks made up to the above formula, but differing as to the dyes contained therein.

Over the ink design impression formed as above described, there was imposed a coating of a water vehicle paint-like substance made up as follows:

45 parts water
5.2 parts casein
2.0 parts diethylenimide dioxide
7 parts sodium resinate
2 parts defoamer
5 parts isopropyl alcohol (91%)
7 parts ethylene glycol
15 parts ammonia type dispersion of resin
350 parts butadiene styrene acid latex
50 parts titanium dioxide
405 parts calcium carbonate
2 parts cobalt naphthenate (6%)

The parts in the above formula are by weight. The diethylenimide dioxide was a product known as "Morpholine" produced by Union Carbide and Chemical Corporation. The ammonia type dispersion and resin was a product sold by Hercules Powder Company under the trade name "Dresinate 215." The latex is a product sold under the designation "X–2566" by Dow Chemical Company. The cobalt naphthenate has a catalytic action in hardening the latex and rendering the coating water-insoluble when dried. The paint-like substance set forth above was knifed on the printed product in a thickness of approximately 0.015 inch as applied. It is subject to some shrinkage as it dries.

Before the last mentioned coating dried it softened or solubilized the dyes in the ink design. These dyes stained upwardly through the thickness of the knifed-on layer or coating producing throughout the thickness and at the surface of design appearance of satisfactory sharpness as respects its elements. The design formed in the knifed-on coating by the staining action had substantially less color intensity than the color intensity of the original inks, as was to be expected; but the color intensity of the design in the top coating was controllable in accordance with the amount of staining dye incorporated in the ink. Furthermore, the knifed-on coating was stained substantially uniformly throughout its depth. The coating when dried was water insoluble and not subject to solution of the dyes when the coating was wet with water. Wear tests were performed on the coatings by rotary abrading means, and the design appearance we found to persist throughout the thickness of the coating. It did not increase substantially in depth of color values as the coating wore away and became thinner.

Another type of ink formula which may be substituted for the ink in Example I is as follows:

50 parts water
4 parts ammonium hydroxide (28%)
8 parts isopropyl alcohol (91%)
18 parts alcohol soluble resin (fortified resin ester)
1 part erioglaucine dye The parts given are by weight. Alcohol and defoamer can be added if desired. The alcohol soluble resin was a resin designated as "SR–80" and sold by Schenectady Varnish Co.

Yet another type of ink formula is:

50 parts methyl cellulose solution in water (2%)
1 part acid yellow dye

The parts are by weight. Again alcohol and defoamer may be added if desired . The methyl cellulose employed was a product sold by Dow Chemical Company under the name "Methocel." Other cellulosic derivatives such as carboxymethylcellulose, hydroxyethylcellulose, and the like may be employed.

The inks suitable for the type of operation outlined in Example I consist essentially of a suitable water soluble dye and a water soluble binder to give body, together with water as a vehicle. Various binders of water-pervious character may be used. Other substances may be added such for example as pigments; but it will be obvious that pigments as such do not normally have any staining qualities.

As to the coating which is to be stained, the type of binder and the type and degree of pigmentation, if any, can be varied. In general the binders include casein, butadiene styrene polymers, other polymers, and dying oils, resins and drying oil-resin combinations which can be or are dispersed or dissolved in water. Many of these substances dry to water insoluble conditions, which is necessary for the fixing of the water soluble dyes. Heat convertible binders which change from a water soluble to a water insoluble state or binders which undergo a similar change upon drying, [alternation] *alteration* of pH or catalyst conversion may be used. It is the function of this coating to be stained and colored by the dye in the ink after which the coating by drying or curing to an insoluble condition renders the dye permanently fixed or by chemical precipitation. Another exemplary stainable coating formula which may be substituted for the above in Example I is:

120 parts water
4.5 parts casein
2.5 parts ammonium hydroxide (28%)
5 parts isopropyl alcohol (91%)
22 parts "Dresinol 215"
170 parts styrene butadiene latex
120 parts alkyd mix
40 parts titanium dioxide
380 parts calcium carbonate The parts are by weight.

The alkyd mix noted above had a formula as follows:

200 parts soya alkyd (100% solids)
2.5 parts lead naphthenate
1.5 parts cobalt naphthenate
1.5 parts manganese naphthenate
4 parts ammonium hydroxide (28%)

Another stainable-coating may be made up as follows:

105 parts water
7 parts casein
0.4 parts sodium hydroxide
6.0 parts "Dresinate X"
10 parts isopropyl alcohol (91%)
148 parts acrylic resin emulsion
25 parts china clay
1 part titanium dioxide
565 parts calcium carbonate The parts in the above formulae are by weight.

Yet another stainable-coating may be made up as follows.

27.2% water
2.3% sodium resinate
2.3% ammonium caseinate
15.0% titanium dioxide
21.2% calcium carbonate
18.1% china clay
13.9% bodied drying oil plus driers It will be noted in the above formulae for the coating which is to be stained that considerable pigmentation in the form of such substances as titanium dioxide, calcium carbonate, china clay and the like is included. The reason for this is that the sealing coat normally applied over felt base materials or other foundation substances is relatively dark in color. Such sealing coatings may vary from a dark cream to a tan or brownish shade. White or lighter backgrounds are desired for many of the more brilliant design effects, and as a consequence the coating which is to be stained is ordinarily desired to have a substantial or complete masking effect as respects the color of the sealing coating. The consistency of the staining coating may be controlled otherwise than by the inclusion of substantially inert pigment-like bodying materials.

The sealing coating is ordinarily a relatively thick coating as applied, say, of the order of 0.007 to 0.02 in. The use of large quantities of relatively expensive whitening pigments in the sealing coat, such for example, as titanium dioxide, is therefore relatively uneconomical. However, in the practice of the invention, a relatively thin masking coating may be knifed on or otherwise applied over the ordinary sealing coat without departing from the spirit of this invention, over a printed design layer on the masking coating.

The product of this invention may be further increased as to its wearing characteristics by the use of a clear coating of varnish or plastic applied over the top of the stained coating when that coating has sufficiently dried. Such an overlying clear coating is indicated in the drawing at 6.

EXAMPLE II

An exemplary non-aqueous ink employing an oil soluble dye may be made up as follows:

60 parts naphtha
8 parts Calco oil lead dye N–1700
300 parts limed rosin in mineral spirits (60%)
5 parts alkyd varnish The parts given are by weight.

It will be obvious to the skilled worker in the art that other oil soluble dyes may be substituted for the one particularly named in the above formula.

Such an ink is suitable for rotary printing in the way hereinabove set forth, and it can be imposed directly on the sealing coating after the latter has dried.

For the coating which is to be stained by the dye in the ink, there may be employed any oleo-resinous paint or enamel, or any alkyd paint of a non-aqueous nature. The staining action proceeds as hereinabove outlined. The vehicle of the paint or enamel coating softens or dissolves the oil soluble dye in the ink. The final product characteristics will be as hereinabove described.

EXAMPLE III

Any spirit (alcohol) soluble dye, such as "Fast Spirit Brilliant Red 3R" may be dissolved in alcohol and thickened to the proper consistency for gravure or rotary printing with an alcohol soluble binder or thickener such as rosin or rosin ester. The addition of higher or polyhydric alcohols will aid the staining action. Such an ink may be printed upon a sealing coat as hereinabove described.

For the coating which is to be stained, a pigmented spirit varnish is employed. An exemplary formula for such a coating substance is:

40% titanium dioxide
60% No. 13 resin solution (Schenectady Varnish Company)

In the case of the staining coating, as in the case of the ink, the addition of higher boiling alcohols or of polyhydric alcohols such as ethylene glycol, will aid the staining action.

The staining action proceeds as hereinabove described.

In all of the examples given, the coating which is to be stained by the dye in the ink may be applied by a coating knife, by roller coating, by roller printing, or by spraying. It can also be applied by flat-bed printing blocks. In fact, the procedure of this invention offers a novel method of combining the realistic effects obtainable by photo-engraved print rolls with the flat-bed printing method used in producing so-called flat-bed floor covering. In this event, an ink containing, say, an oil or organic solvent soluble dye or staining material is used to print, by gravure or offset, a photo-engraved design on the sealing coat. Then the usual flat-bed enamels would be printed by blocks on a flat-bed printing machine. In this way unusual effects may be obtained, since the dye inks stain upwardly through the layer or layers of enamel or paint applied by the flat-bed blocks, so that in addition to the pattern which is produced by the flat-bed printing (which pattern, of course, can be in contrasting colors), the pattern produced by the gravure printing becomes visible on the surface of the product and extends throughout the thickness of the enamel coating.

The staining effect which is contemplated by this invention occurs primarily when the solvent or vehicle of the staining layer softens and dissolves the stains or dyes in the ink layer. Thus, the ink-like materials which contain the dyes or stains may be wet, partially dried, or completely dried before the staining layer is applied. The manner in which the staining layer is applied is determinative, for it will be clear that if the staining layer is to be knifed on over a previously printed design layer in ink, the design layer must be dried or set sufficiently to resist displacement by the application of the staining layer. Since the staining occurs primarily through the action of the solvent or vehicle of the staining layer on the dyes or stains in the ink, it is readily possible to dry the ink layer to whatever degree is deemed necessary or advisable before the application of the staining layer.

Coatings underlying the ink layer may be more or less absorptive to the dyes and stains. In the use of water vehicle materials for the staining coating, such for example, as those given in connection with Example I, where the coating substance hardens to a water insoluble condition upon drying, if such a coating is applied over the sealing coat, and then printed with inks containing dyes, there will be substantially no downward penetration of the dyes or stains. The same thing is true of the other types of staining coatings set forth herein, when completely dried. The inks are applied in relatively thin coatings, and the quantity of solvent or vehicle which they carry is not enough to produce any great depth of softening in an underlayer. However, it is possible to apply over a sealing coating a coating of stainable material as herein set forth, and then dry it incompletely but enough to serve as a base for printing. Ink layers may then be printed on such a coating with substantial downward penetration of the dyes therein. After further drying, particularly of the ink layers, an overcoating of staining material may be applied, which will stain through as hereinabove described. Thus, a product may be made with two layers of stained coating, and a consequently longer wear-life, although the design effect in the lower layer is not usually as brilliant or as dependable as that in the upper layer.

If a coating underlying the ink layer has a substantial porosity, the dyes in the inks will stain downwardly, even though the layer be fully dried. However, since porosity is normally achieved in coatings by loading them with filler materials or pigments at the expense of the binder, a porous coating tends to have less strength and wear resistance than a non-porous coating. In general, therefore, too great porosity is to be avoided.

Modifications may be made in the invention without departing from the spirit of it. The invention having been described in certain exemplary embodiments, what is claimed as new and desired to be secured by Letters Patent is:

1. A floor and wall covering material comprising a flexible support, a smooth sealing coating on said support comprising a filler material and a binder substance in an aqueous medium, said binder substance being chosen from a class consisting of oleo and oleo-resinous emulsions and synthetic polymer latices, a printed design impression on said sealing coating formed of ink comprising a vehicle and a soluble dye, and a relatively thicker opaque layer of wear coating material imposed upon said design layer, said wear coating comprising a filler material and a binder substance chosen from a class consisting of *casein,* oleo and oleo-resinous substances and synthetic rubber polymers, the said wear coating being stained by the dye from said ink substantially throughout its thickness and substantially uniformly to the top surface thereof, whereby to provide at said top surface a design appearance which will remain substantially constant as said wear coating wears away.

2. The product claimed in claim 1 wherein said dye is a water soluble dye, wherein said wear coating was initially applied as a dispersion in a water vehicle, the water of said vehicle acting as a solvent for said dye, and wherein said wear coating in its final dried condition is water resistant.

3. The product claimed in claim 2 having a clear layer [of varnish] overlying the said wear coating *and chosen from a class consisting of varnish and plastic.*

References Cited by the Examiner

The following references, cited by the Examiner, are of record in the patented file of this patent or the original patent.

UNITED STATES PATENTS

| | | | |
|---|---|---|---|
| 1,971,036 | 8/34 | Graham et al. | 117—15 |
| 2,095,246 | 10/37 | Graham et al. | |
| 2,202,488 | 5/40 | Graham et al. | |
| 2,403,084 | 7/46 | James | 117—45 |
| 2,624,682 | 1/53 | Hazeltine. | |
| 2,629,956 | 3/53 | Switzer. | |

WILLIAM D. MARTIN, *Primary Examiner.*